Figure 1:
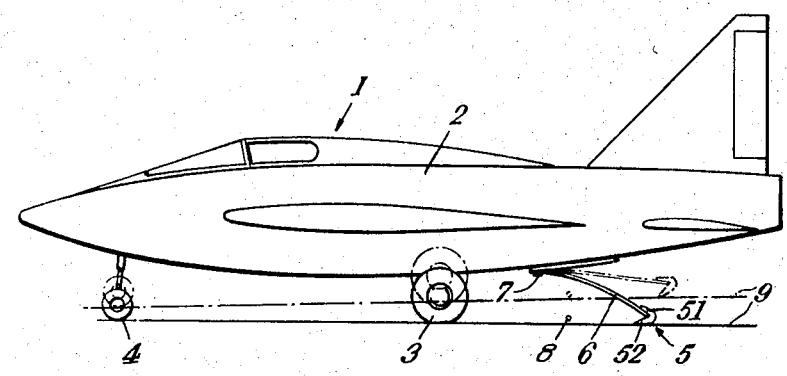

March 26, 1968   A. N. RHODES ETAL   3,374,970
ARRESTER HOOKS FOR AIRCRAFT
Filed Sept. 6, 1966   4 Sheets-Sheet 1

Inventors
Arthur Neville Rhodes +
Alfred Edward Ellison
By Nolte + Nolte
Attorneys

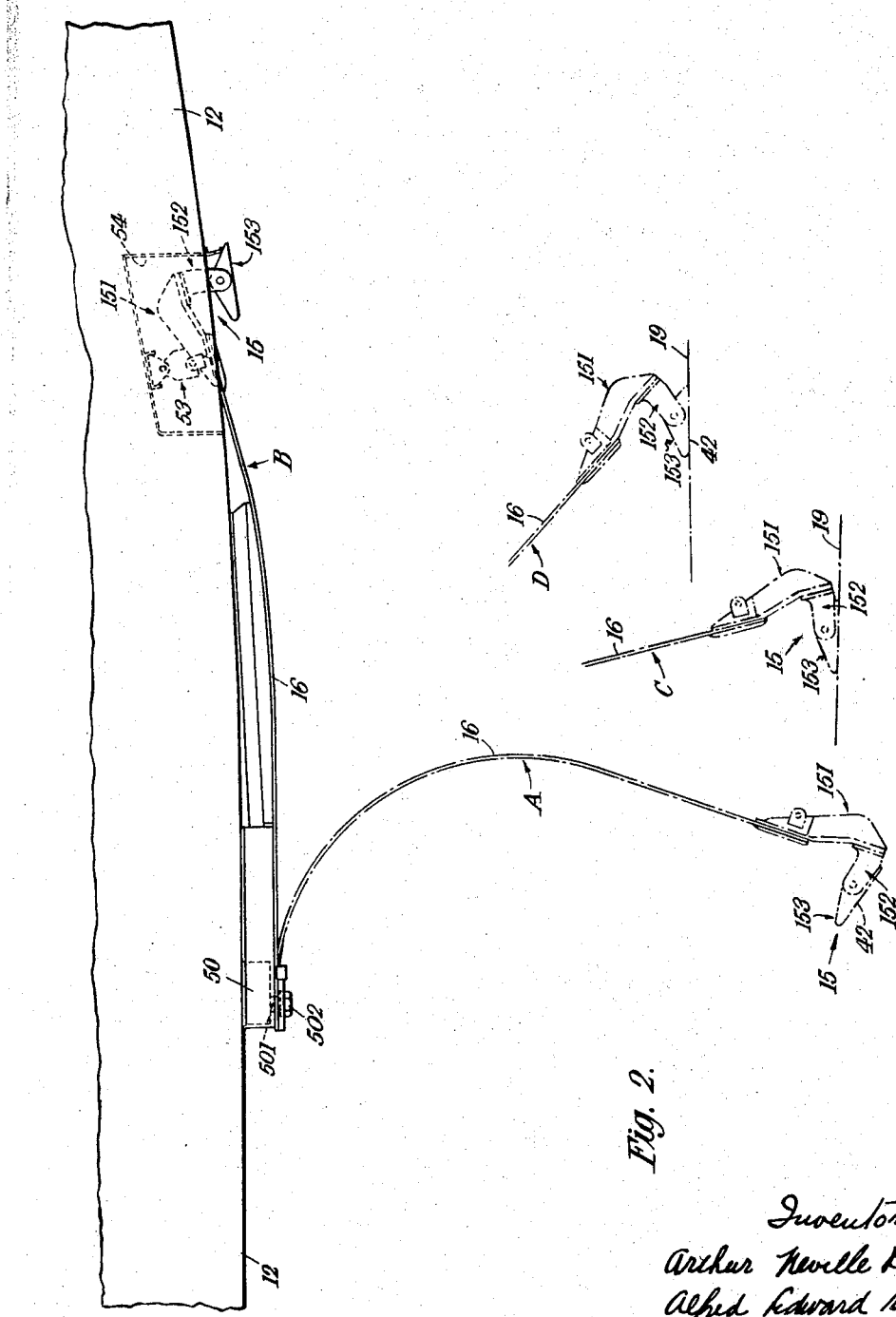

March 26, 1968   A. N. RHODES ETAL   3,374,970
ARRESTER HOOKS FOR AIRCRAFT
Filed Sept. 6, 1966   4 Sheets-Sheet 3

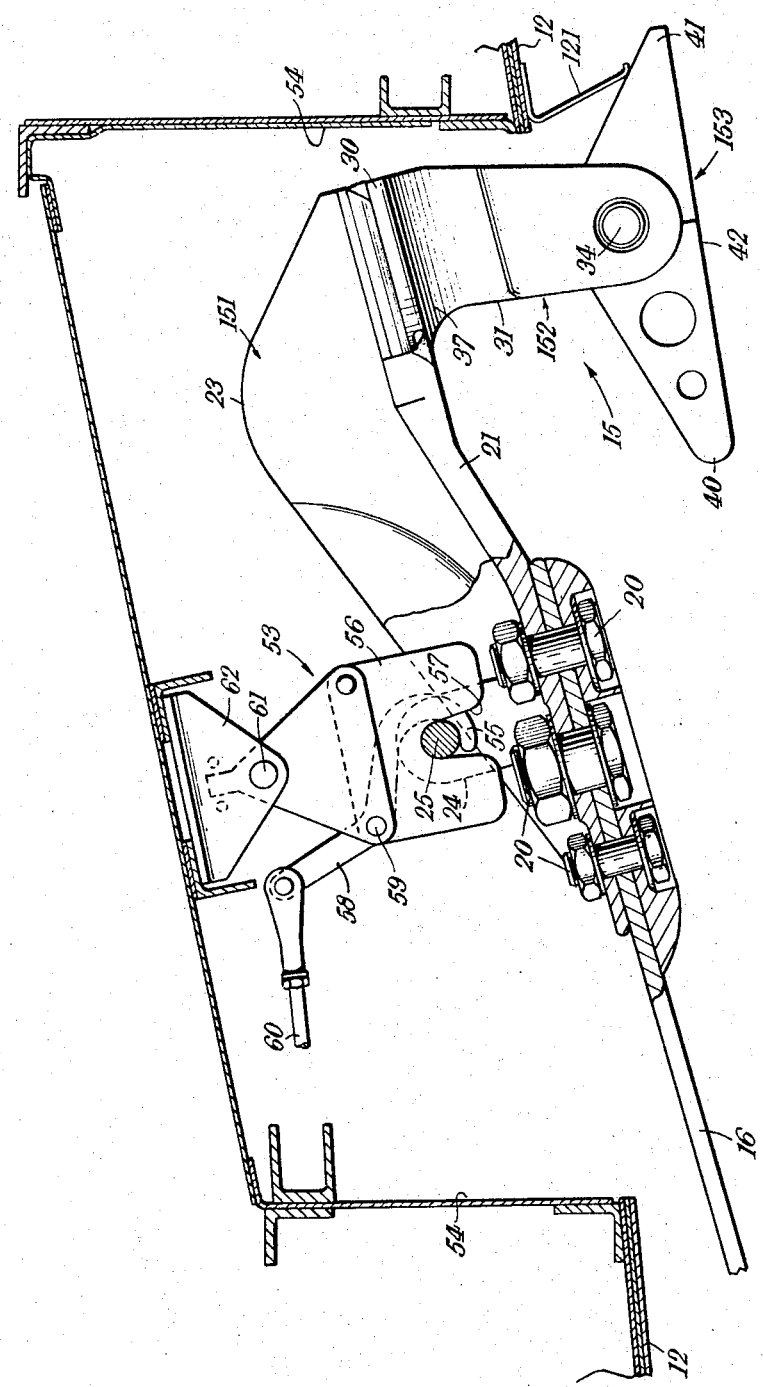

United States Patent Office 3,374,970
Patented Mar. 26, 1968

3,374,970
ARRESTER HOOKS FOR AIRCRAFT
Arthur N. Rhodes, Fulwood, Preston, and Alfred E. Ellison, Lytham St. Anne's, England, assignors to British Aircraft Corporation (Operating) Limited, London, England, a British company
Filed Sept. 6, 1966, Ser. No. 577,230
8 Claims. (Cl. 244—110)

This invention relates to arrester hooks for aircraft. Arrester hooks have in the past been more usually fitted to ship-based aircraft but they are becoming increasingly used with land-based aircraft. In either case the arrester hook is secured during normal flight in or to the underside of the aircraft fuselage but is extended during landing so that the hook trails below the aircraft, e.g. on the free end of a sprung metal strip, and engases an arrester wire laid transversely across the landing surface, i.e. an aircraft carrier deck or a runway. In one conventional form, the arrester hook consists of a leg portion, which is attached to the said metal strip, and a foot extending forwards roughly at right angles to the leg, with an arrester wire-engaging notch in the "instep" or angle between the foot and leg. The foot is disposed at such an angle to the leg that, when the aircraft approaches an arrester wire at its usual ground-running attitude with the hook extended, the foot extends parallel to the landing surface, so that it runs along the surface and scoops up the arrester wire. Due to varying conditions, such as variations in the all-up weight of the aircraft or in the longitudinal position of its centre of gravity, the ground clearance from the landing surface to the point of attachment of the suspension means (e.g. the metal strip) to the aircraft may vary considerably, thus causing the hook to adopt quite different attitudes as it approaches the arrester wire, so that the angle of the foot of the hook in relation to the landing surface is subject to variation and there is a risk that the hook will not satisfactorily engage the arrester wire.

According to the present invention, an arrester hook for an aircraft comprises a leg portion adapted to be connected through suspension means to the aircraft, a foot portion extending at an angle to the leg portion and providing a notch or groove for receiving an arrester wire in the instep or angle between the leg portion and the foot portion, and an elongated toe portion having substantially flat under-surface for riding over the landing surface, said toe portion being pivotally mounted on a transverse axis in the foot portion so as to be capable of adapting itself to variations in the relative angle between the hook and the landing surface. In this way the angle of the toe portion relative to the landing surface is made independent of varying conditions and thus a more reliable engagement of the arrester hook with the arrester wire is ensured.

Figure 3:
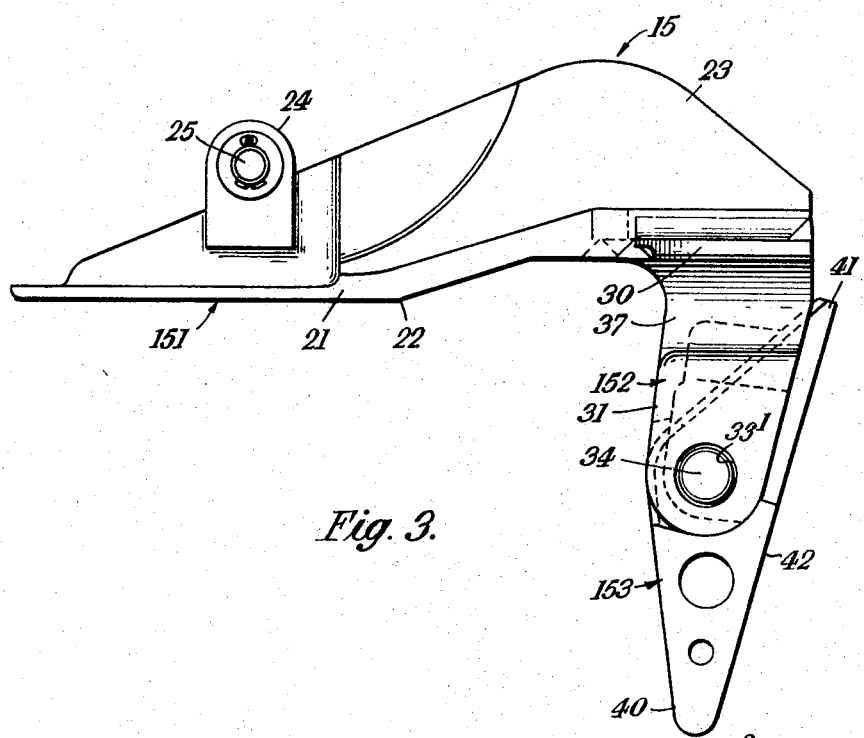
Figure 4:
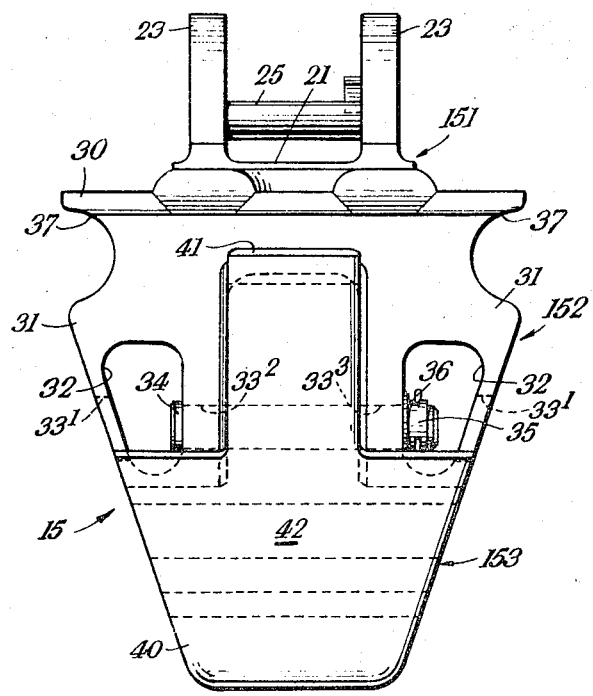
Figure 5:
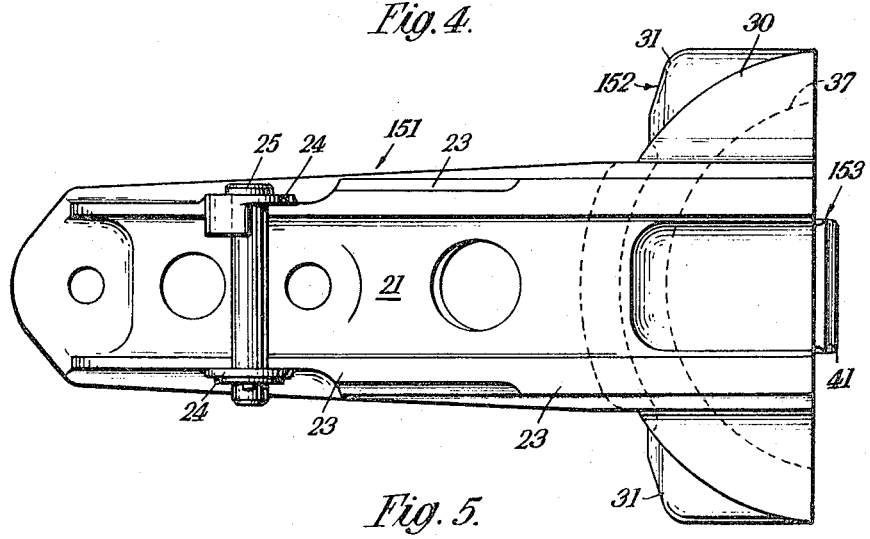

A specific embodiment of the invention will now be described by way of example and with reference to the accompanying drawings, in which:

FIG. 1 is a side elevation of an aircraft which has just touched down and which has a conventional arrester hook which is about to engage an arrester wire, FIG. 2 is a side elevation to a larger scale of the rear part of the fuselage of an aircraft fitted with an arrester hook according to the present invention, showing the attachment of the arrester hook and the various attitudes which it can adopt, FIG. 3 is a side elevation, FIG. 4 is a front elevation, and FIG. 5 is a plan view, all to a larger scale again, of the arrester hook itself, and FIG. 6 is a detail view showing the manner in which the arrester hook is secured during normal flight.

The aircraft 1 shown in FIG. 1 has a fuselage 2, a pair of main undercarriage wheels 3 (only one of which can be seen), a nose-wheel 4 and an arrester hook 5 suspended on the free end of a sprung metal strip 6 whose other end is secured to the fuselage 2 at 7. The arrester hook 5 consists of a leg portion 51 secured to the strip 6 and a fixed foot portion 52. The arrester hook 5 is shown sliding along the landing surface 9 and about to engage an arrester wire 8 laid transversely across the landing surface 9 (aircraft carrier deck or runway) in known manner. The wheels 3, 4 are spring-mounted, so that with variations of the all-up weight of the aircraft 1 and with variations of the longitudinal position of its centre of gravity, the positions of the wheels 3, 4 and the landing surface 9 relative to the fuselage 2 may vary between the positions shown in full lines and those shown in dotted lines. It will be seen that the variation in the clearance between the fuselage 2 and landing surface 9 can cause the arrester hook 5 to adopt quite different attitudes relative to the landing surface 9. In the attitude shown in dotted lines, there is a risk that the foot portion 52 of the hook 5 may slip over the arrester wire 8 instead of engaging below it.

FIGS. 2 to 6 illustrate an arrester hook according to the invention, in which a toe portion is pivotally mounted on the foot portion so that it can adapt itself to variations in the relative angle between the hook and the landing surface. The arrester hook 15 of FIGS. 2 to 6 comprises a leg portion 151, which is secured by bolts 20 (FIG. 6) to the sprung steel strip 16, and a foot portion 152 which extends substantially at right angles to the leg portion 151 and carries the pivotal toe portion 153.

The form of the arrester hook 15 is most clearly shown in FIGS. 3, 4 and 5. The leg portion or shank 151 comprises a base plate 21, bent through an angle of approximately 20° at 22 and formed with a pair of substantially triangular longitudinal stiffening ribs or webs 23. The webs 23 each have a lug 24 welded to them, and a transverse pin 25 is accommodated in aligned bores in the lugs 24.

The foot portion 152 comprises a part-circular top plate 30 which is welded to the end of the base plate 21 of the leg portion or shank 151 and to the webs 23. The top plate 30 is integral with a pair of depending members 31 formed with fore-and-aft slots 32 and aligned bores 33', 33², 33³ and 33⁴ passing transversely right through the foot portion 152. A headed pivot pin 34 is accommodated in the bores 33², 33³ and held therein by a collar 35 secured by a split pin 36. A part-circular horizontal groove or notch 37 is formed in the upper parts of the members 31, just below the top plate 30 and in the instep or angle between the foot portion 152 and the leg portion 151, of a size to receive an arrester wire such as that shown at 8 in FIG. 1.

The toe portion 153 has the form of an obtuse-angled triangle as seen in elevation (FIGS. 2, 3 and 6) and it is pivotally mounted near its centre point on the pivot pin 34. Its front part 40 is tapered as seen in front view (FIG. 4) to continue the lines of the depending members 31 of the foot portion 152. Its rear part 41 is reduced in width to fit between the members 31. The hypotenuse undersurface 42 of the toe portion 153 is substantially flat. The weight of the front part 40, being greater than that of the rear part 41, biasses the toe portion 153 into the position shown in FIGS. 3 and 4. If desired, a spring (not shown) could also be provided for this purpose.

The sprung steel strip 16 is secured at its end remote from the arrester hook 15 to the underside of the fuselage 12 by means of a mounting bracket 50, stud 501 and nut 502. When extended during the landing approach, the strip 16 assumes the position shown at A in FIG. 2, but during normal flight it is constrained to remain in the position shown at B by a releasable attachment unit shown generally at 53 in FIG. 6 which attaches the arrester hook 15 to the underside of the fuselage 12. As can be seen in FIG. 6, the attachment unit 53 retains the arrester hook 15 in a partly housed position in a recess 54 in the fuselage 12, and a small projection 121 on the fuselage 12 causes the toe portion 153 to be rotated into the position shown, in which it offers a minimum frontal area to the slipstream.

The attachment unit 53 comprises a forward-facing hook 55 and a pivoted plate 56 having a downward-facing slot 57, both of which engage the pin 25 on the leg portion 151 of the arrester hook 15. The hook 55 is formed on one end of a lever 58, which is pivotally mounted on the pivoted plate 56 at 59 and whose other end is connected to a control rod 60 operable by the pilot. The plate 56 is pivotally mounted at 61 on a mounting bracket 62.

Forward movement of the rod 60 under the control of the pilot during the landing approach will cause anti-clockwise rotation of lever 58 and clockwise rotation of plate 56, thereby releasing the pin 25, and the sprung steel strip 16 will then cause the arrester hook 15 to escape downwards so that it is suspended below the aircraft on the end of the strip 16 in position A (FIG. 2). As the aircraft touches down on the landing surface 19 (which may be a runway of an airfield or the deck of an aircraft carrier) the arrester hook 15 will also contact and slide along the surface 19. Position C in FIG. 2 illustrates the position adopted by the arrester hook 15 when the aircraft lands at its minimum all-up weight, e.g. with empty fuel tanks and no payload, while position D illustrates the conditions when landing at the maximum all-up weight. Although the change in ground clearance causes a very considerable change in the attitude of the arrester hook 15 as a whole to the landing surface 19, the pivotal toe portion 153 adapts itself to the different attitudes and slides along the surface 19 with its hypotenuse surface in parallel contact therewith in every case. The toe portion 153 thus always assumes the attitude illustrated at C and D, in which it is best placed to slide under an arrester wire and guide it into the groove 37 in the instep between the foot portion 152 and the leg portion 151.

What we claim as our invention and desire to secure by Letters Patent is:

1. An arrester hook for an aircraft, comprising a leg portion adapted to be connected through suspension means to the aircraft, a foot portion extending at an angle to the leg portion and providing a notch for receiving an arrester wire in the instep or angle between the leg portion and the foot portion, and an elongated toe portion having a substantially flat under-surface for riding over the landing surface, said toe portion being pivotally mounted on a transverse axis in the foot portion so as to be capable of adapting itself to variations in the relative angle between the hook and the landing surface.

2. An arrester hook according to claim 1, wherein the toe portion has substantially the form of an obtuse-angled triangle in elevation, the under-surface being the hypotenuse of the triangle.

3. An arrester hook according to claim 1, wherein the toe portion is mounted on a pivot pin between two depending members of the foot portion.

4. An arrester hook according to claim 3, wherein the width of the front part of the toe portion is similar to the overall width of the foot portion while the rear part of the toe portion is reduced in width to fit between the two depending members.

5. An arrester hook according to claim 1, wherein the foot portion is formed with a part-circular groove for engaging an arrester wire.

6. An arrester hook according to claim 1, wherein the leg portion comprises a base plate carrying a pin by which the hook can be releasably attached to the underside of the aircraft fuselage.

7. An aircraft provided with an arrester hook according to claim 1, wherein the leg portion of the arrester hook is connected to the aircraft fuselage through suspension means in the form of a sprung metal strip.

8. An aircraft according to claim 7 and provided with releasable attachment means for securing the arrester hook at least partially housed in a recess in the aircraft fuselage during flight.

References Cited

UNITED STATES PATENTS

| 2,276,312 | 3/1942 | Jurschick | 244—110 |
| 2,989,272 | 6/1961 | Schaeffer | 244—110 |

FOREIGN PATENTS

| 734,872 | 4/1943 | Germany. |

MILTON BUCHLER, *Primary Examiner.*

P. E. SAUBERER, *Assistant Examiner.*